United States Patent [19]

Prysby et al.

[11] 4,210,940
[45] Jul. 1, 1980

[54] VARIABLE FORMAT TAPE REPLAY SYSTEM

[75] Inventors: Daniel G. Prysby, Elk Grove Village; Ian L. Bower, Rosemont; William B. Huber, Oak Park, all of Ill.

[73] Assignee: Bell & Howell Company, Chicago, Ill.

[21] Appl. No.: 946,989

[22] Filed: Sep. 29, 1978

[51] Int. Cl.² ................... G11B 27/00; G11B 5/02
[52] U.S. Cl. ............................ 360/33; 360/72.3; 360/12; 179/100.1 PS; 179/100.1 C; 360/14
[58] Field of Search ............. 179/100.1 C, 100.1 PS, 179/100.4 D; 360/12, 13, 14, 33, 60, 137, 72.1, 72.2, 72.3, 74.2, 74.4, 15

[56] References Cited

U.S. PATENT DOCUMENTS

| | | | |
|---|---|---|---|
| 3,541,271 | 11/1970 | Joslow | 360/14 |
| 3,601,553 | 8/1971 | Cooper | 360/72.3 |
| 3,601,554 | 8/1971 | Rak | 360/72.3 |
| 3,601,556 | 8/1971 | Cooper | 360/72.3 |
| 3,714,382 | 1/1973 | Sykes | 360/72.3 |
| 3,721,757 | 3/1973 | Ettlinger | 360/72.2 |
| 3,804,993 | 4/1974 | Honnold | 179/100.1 PS |
| 3,812,532 | 5/1974 | Crosser | 360/72.2 |
| 3,913,133 | 10/1975 | Aregger | 360/72.3 |
| 3,921,220 | 11/1975 | Primosch | 360/72.3 |
| 3,949,420 | 4/1976 | Older | 360/72.3 |
| 3,987,484 | 10/1976 | Bosche | 360/33 |
| 3,990,710 | 11/1976 | Hughes | 360/15 |
| 4,000,518 | 12/1976 | Stearns | 179/100.1 PS |
| 4,054,926 | 10/1977 | Haynes | 360/72.1 |
| 4,141,045 | 2/1979 | Sheehan | 360/15 |

OTHER PUBLICATIONS

*Television Broadcasting*, ©1973 Howard W. Sons, Inc., pp. 328–331.

Primary Examiner—James W. Moffitt
Assistant Examiner—Alan Faber
Attorney, Agent, or Firm—John H. Moore; Roger M. Fitz-Gerald

[57] ABSTRACT

A system is described for selecting and replaying desired tape segments of a recorded tape, a video tape for example, in any predetermined sequence. The system accepts an operator's designation of which segments of the tape are desired for replay and in which sequence those segments are to be replayed, irrespective of the location of the selected segments on the tape. An electronic controller, responsive to the operator's designations, causes the playback machine to replay each selected tape segment in the proper sequence.

16 Claims, 15 Drawing Figures

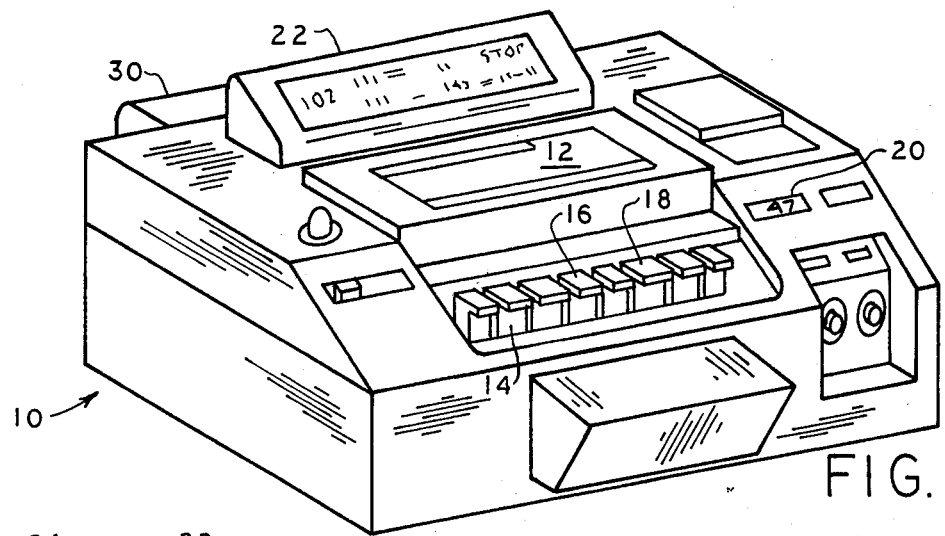
FIG. 1
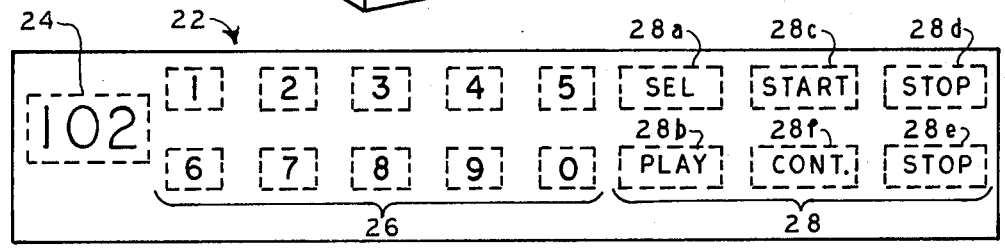
FIG. 2
FIG. 4
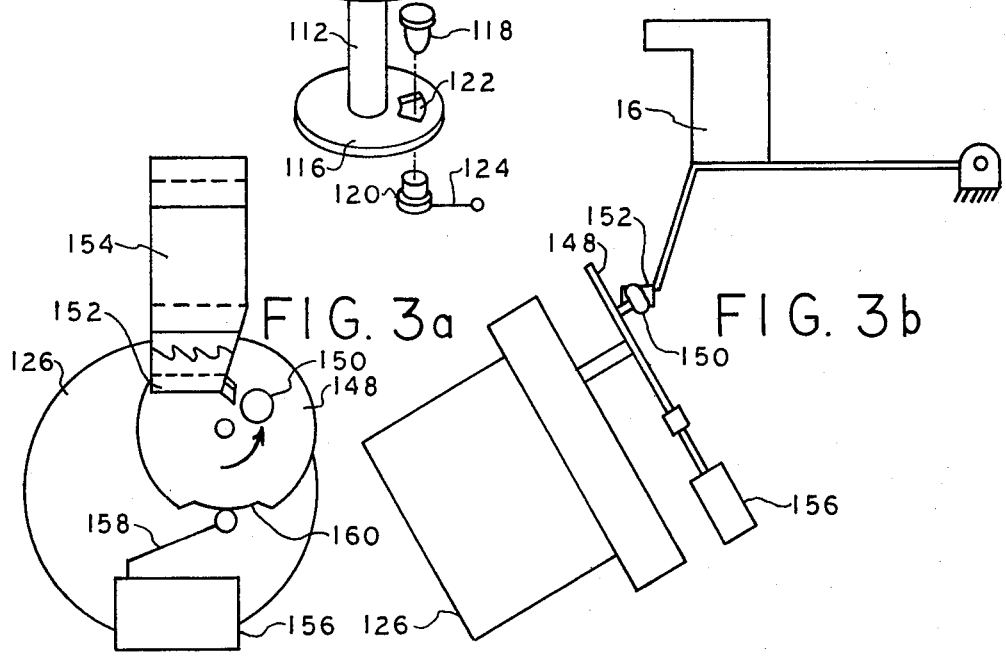
FIG. 3a
FIG. 3b

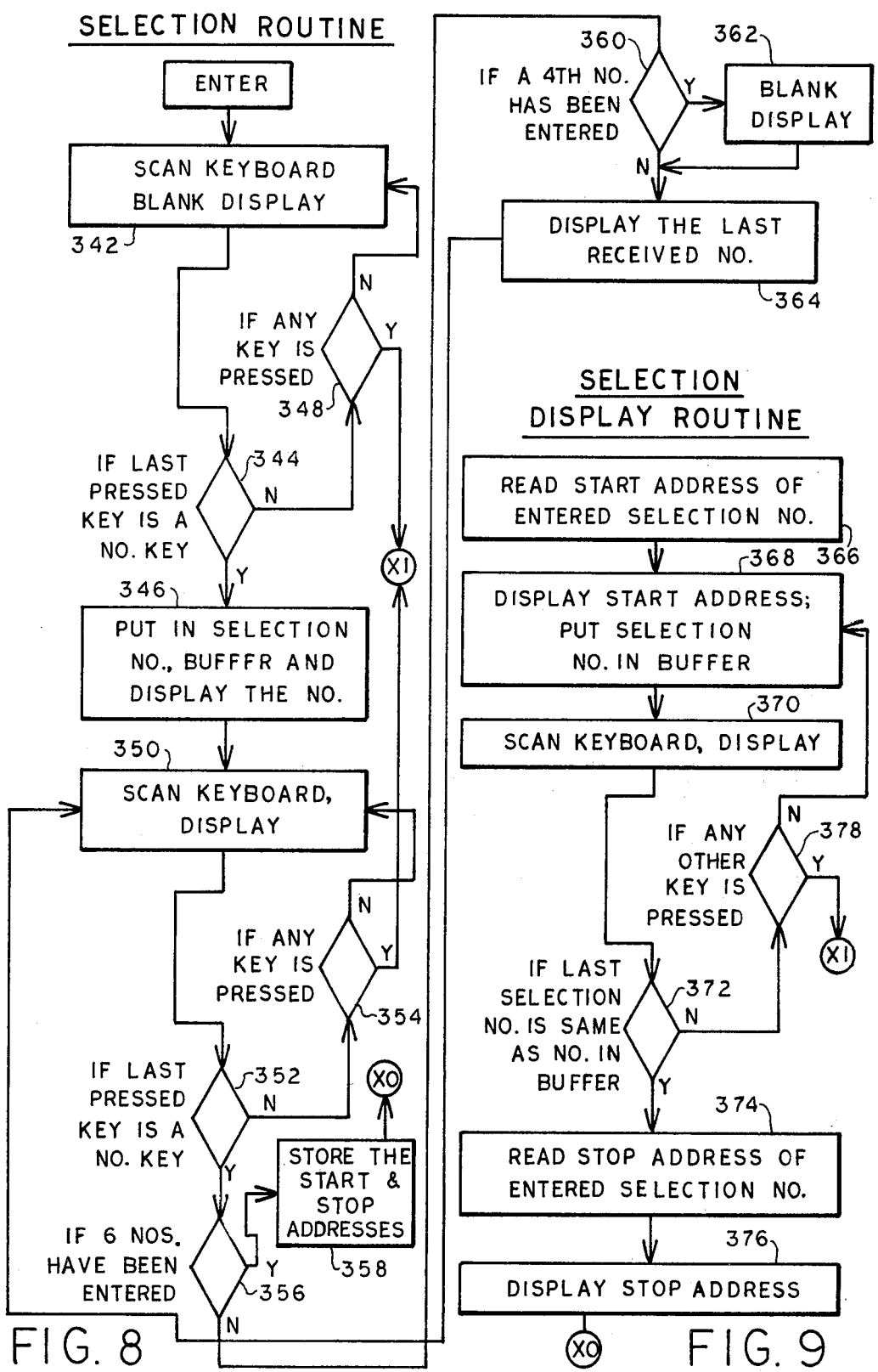

VARIABLE FORMAT TAPE REPLAY SYSTEM

BACKGROUND OF THE INVENTION

This invention is directed generally to machines for playing back information previously recorded on tape. The invention is particularly addressed to a system for modifying the playback of the tape according to any desired format.

The art has previously proposed a number of ways of altering either a playback machine or a cassette in which the recorded tape is enclosed for modifying the replayed format of the tape. For example, it has been proposed to include sensor tabs on an audio cassette to enable the playback machine to skip various portions of the tape on playback. Other proposals have made it possible to start the playback of a tape at a particular segment thereof. However, prior proposals limit the ability of an operator to easily select particular segments of a tape for playback and to cause the machine to replay those segments in any sequence, as for example, first replaying a segment recorded in the middle of the tape and for replaying other tape segments located at other positions on the tape. Accordingly, the prior proposals generally limit the ability of an operator to format the replay of the tape.

OBJECTS OF THE INVENTION

It is a general object of the invention to provide an improved system for re-formatting a recorded tape for playback.

It is a more particular object of the invention to provide a system for re-formatting the replay of a tape so that various segments of the tape are replayed in any preselected sequence.

It is a further object of the invention to provide such a system which allows an operator to choose for replay any segments of a recorded tape and to easily modify that choice.

It is yet another object of the invention to provide such a system which is easily adaptable as an "add on" to existing playback machines.

BRIEF DESCRIPTION OF THE FIGURES

The above and other objects of the invention are more particularly set forth in the following detailed description and in the accompanying drawings of which:

FIG. 1 illustrates a video playback machine incorporating the invention as an "add on" to the machine;

FIG. 2 is an enlarged view of a display panel on the machine of FIG. 1;

FIGS. 3a and 3b illustrate a motor, cam, and switch arrangement for actuating a push-button switch on the machine of FIG. 1;

FIG. 4 depicts an illustrative pulse generator for providing pulses which are counted to determine the location of the tape;

FIG. 8 is a flow chart of a selection routine depicted generally in FIG. 7;

FIG. 9 is a flow chart of a selection display routine shown generally in FIG. 7;

SUMMARY OF THE INVENTION

Figure 5:
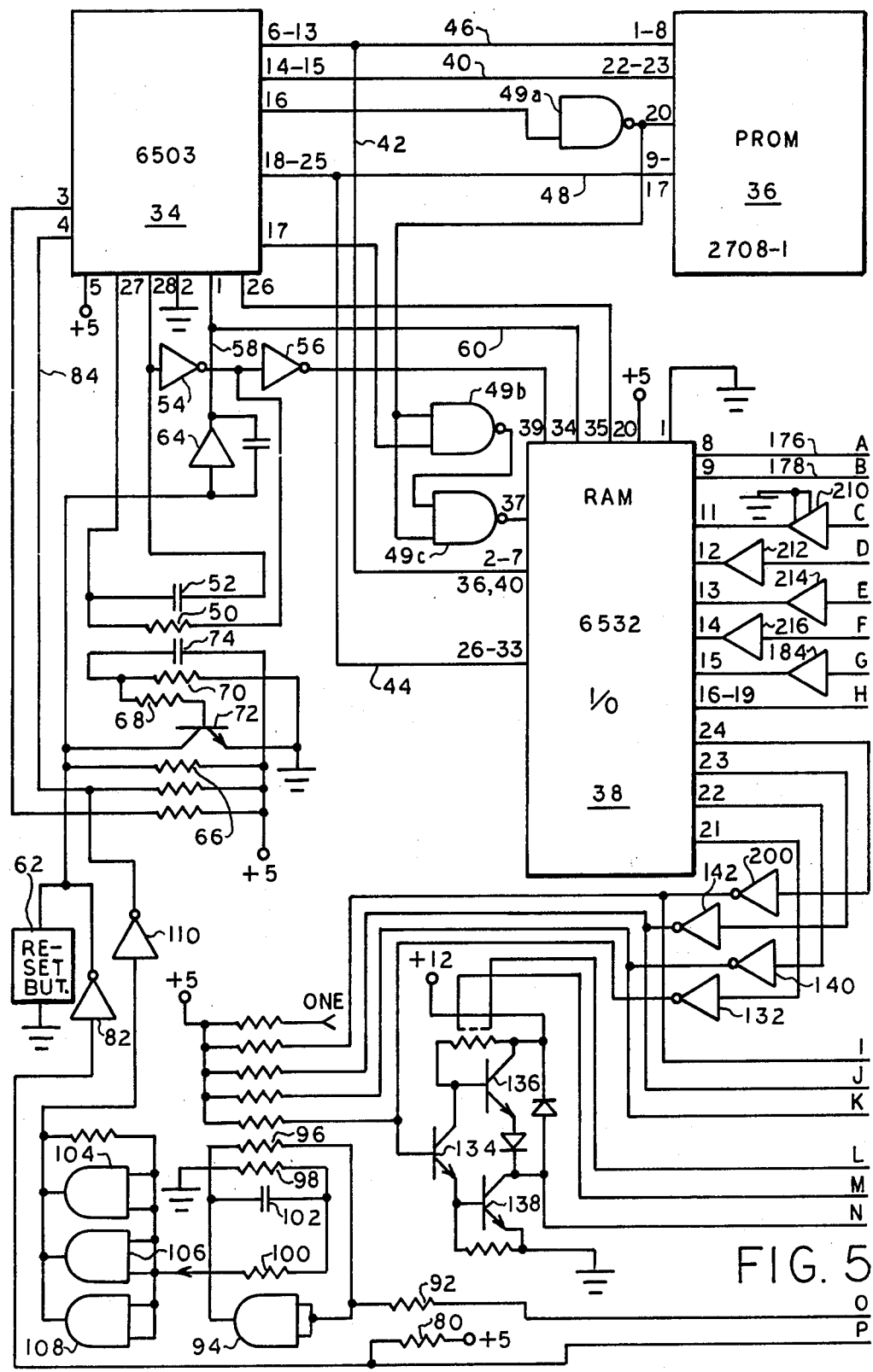
FIGS. 5 and 6 constitute a schematic drawing of a microprocessor controller for controlling the functions of the playback machine.

According to the preferred embodiment of the invention, a microprocessor-controlled system is coupled with a conventional tape playback machine so as to permit selection of any desired tape segment for replay and to actuate the machine to replay the selected tape segments in any sequence selected by an operator. Toward this end, there is included means, preferably in the form of operator actuatable switches, for entering the starting and stopping addresses of the tape sections desired to be replayed. Preferably, the operator identifies those starting and stopping addresses by observation of a conventional tape footage counter in the playback machine. The operator is also provided with means for instructing the system of the sequence in which selected tape segments are to be replayed.

A controller stores the entered tape addresses and the tape sequence instructions and activates the playback machine for replaying each selected tape segment from its starting address to its stopping address and in the sequence selected by the operator.

DESCRIPTION OF THE PREFERRED EMBODIMENT

Referring now to FIG. 1, there is shown a video playback machine 10 which is modified in accordance with the invention. The machine 10, as is conventional, has an access panel 12 which raises to permit insertion and removal of a standard video tape cassette. As the tape is played, a television monitor (not shown), connected to the machine 10, displays the information recorded on the tape in standard television format.

Located near the front of the machine 10 are a number of push-buttons which are designed to be actuated by an operator for controlling the machine. Included are a "play" button 14, a "rewind" button 16, and a "fast-forward" button 18, all conventional.

Also included with the machine 10 is a so-called "footage counter" 20 for generating visual, continuously updated tape position indicia corresponding to the position of the transported tape. More specifically, the tape footage counter 20 displays numbers to indicate how much of a tape has been played. For example, when the counter 20 shows 47, that is an indication that tape position 47 is presently being run past the play head (not shown). According to one aspect of the present invention the numbers displayed by the counter 20 are used to indicate starting and stopping positions of a tape segment which is desired to be replayed. For example, with an operator viewing a television monitor as the tape is being played, the operator will determine the starting address of a tape segment desired to be replayed by noting the number shown by the counter 20 when that desired tape segment begins. In like manner, the operator will note the number displayed by the counter 20 when he views that portion of the tape at which he wishes the desired tape segment to stop. The numbers noted by the operator constitute the starting and stopping addresses, respectively, of the tape segment which is to be replayed. As is described in more detail below, the operator may view the monitor and choose a number of tape segments which he desires to be replayed by noting the starting and stopping address of each segment.

The footage counter 20 is conventional in construction and is not shown in detail. Suffice it to say that it may be driven by a belt from the tape's take-up reel as in the Panasonic video playback machine, model NV-8300.

The description thus far has been primarily directed to hardware of the machine 10 which is conventional, as found in the above-noted Panasonic machine. The discussion will now be directed to the modifications to the conventional machine to which the invention is directed.

Located atop the machine 10 is a display/select panel 22 which is shown in more detail in FIG. 2. As shown, the panel 22 includes a light-emissive display 24, a plurality of numbered pressure-sensitive switches or keys 26, and a plurality of pressure-sensitive control switches or keys 28. The switches 26, 28 and display 24 are connected to a microprocessor-based controller located in a package 30 mounted on the rear of the machine 10. Located on the front of the machine 10 is a compartment 32 housing a motor/cam and switch arrangement for automatically operating the push-buttons 14, 16, and 18 in response to the controller. With this arrangement, the modifications to the machine 10 can be made as part of an "add-on" package to a conventional machine.

Before beginning a detailed description of the apparatus embodying the invention, the overall operation of the modififed machine 10 will be described from an operator's standpoint. A videotape to be used on the machine 10 may be recorded with any type of information. For example, the tape may be recorded with a sales presentation, instructional material, or virtually any other type of information. By following the steps recited below, an operator can totally re-format the entire tape to play designated segments thereof back repeatedly in any desired sequence. To determine which segments of the tape the operator desires to be played back and the sequence of their playback, the operator must, of course, view the contents of the tape on a monitor. As described above, when the operator determines that he wishes to have replayed a segment of the tape which begins, for example, when the counter 20 shows the number 47, the operator will note that 47 is the starting address of the desired tape segment. The operator will then continue viewing the tape and when he determines a desired stopping point for this tape segment, he again notes the reading on the counter 20 which may be, for example, 55. Thus, the operator knows that the numerals 47 and 55 designate the starting and stopping addresses of that first particular tape segment.

Continuing with his observation of the tape contents, the operator may note several other tape segments and their starting and stopping addresses as described above. These other tape segments may overlap with the first tape segment, may overlap with each other, and may occur in any position on the tape. Assuming by way of example that the operator has selected four tape segments for replay and has noted the starting and stopping addresses of each as indicated by the counter 20, the operator may designate those tape segments as segments 1, 2, 3, and 4, respectively.

Having determined which segments of the tape he desires to be replayed, the operator then presses a select switch 28A on the panel 22. This instructs the controller that the operator wishes to re-format the tape in the machine and removes the machine from its conventional manual mode.

Thereafter, the operator presses the switch 26 numbered "1" on the panel 22 to signify that the next input to the panel 22 will be the operator's first tape selection. Next, the operator presses three of the numbered switches 26 to indicate the starting address on the tape of the first selected tape segment. For example, if the starting address of the first selected tape segment is 47, as previously indicated by the counter 20, the operator would press the switches 26 corresponding to 047. When this occurs, the light emissive display 24 illuminates with the numerals 047 to indicate to the operator which buttons 26 he has previously depressed. The operator then presses three more of the switches 26 to enter the stopping address of his first selected tape segment and these last-entered digits then appear on the display 24.

The operator follows the same procedure set forth above for entering the starting and stopping addresses of any further tape segments which he desires to be played back. For example, to enter the starting and stopping addresses of a second tape segment, the operator will first depress the switch 26 as designated as "2" to instruct the controller that the address entries to follow are those of the second tape segment. Then the six digits corresponding to the starting and stopping addresses for the second tape segment are entered. The same procedure is followed for the entry of each additional tape segment.

At this point in time, the operator may cause the display 24 to indicate the starting address of any tape segment merely by pressing the selection number previously depressed by the operator. For example, if the operator wishes to determine the starting address for the second tape segment, he merely depresses the switch 26 designated as "2". When that occurs, the display 24 will illuminate with the starting address of the second tape segment. Pressing the switch "2" again causes the display 24 to illuminate with the stopping address previously entered for the second tape segment. In this manner the starting and stopping addresses for each tape segment may be displayed merely by pushing the switch 26 whose number corresponds to the chosen segment number of the tape.

The starting and stopping addresses of each desired tape segment having been entered, the operator presses the play switch 28B to prepare the machine for playback of each of the designated tape segments. In addition, the operator presses the switches 26 once again to instruct the machine as to what sequence he desires the tape segments to be played back. For example, assuming that the operator has designated four tape segments to be replayed, those segments may be replayed in the sequence 1, 3, 2, 4 merely by pressing the numbered buttons 26 identified as 1, 3, 2, 4 in that order. Any other sequence may be entered. Thus, the operator is not restricted to playing back tape segments as they occur sequentially on the tape. On the contrary, any portion of the tape may be replayed in any sequence. Moreover, by appropriately choosing starting and stopping addresses of the tape segments, the tape segments may repeat or overlap. Thus, the operator has the freedom to totally re-format the information on the tape in any desired sequence or combination.

To start the playback of the designated tape segments, the operator then merely presses the start switch 28C. When it is desired to stop the playback, the operator need merely press one of the stop buttons 28D or 28E. If the operator then desires to continue the playback from the point at which the tape was stopped, he presses the continue button 28F and the playback of the tape will resume where it was discontinued.

Considering now the controller for controlling the machine 10 to effect the functions described above, reference is made to FIGS. 5 and 6, the latter of which is a continuation of FIG. 5. As shown in these figures, the controller includes a number of integrated circuit chips, each of which is shown with its commercial identifying number. In addition, the pins of each chip are indicated to show the preferred manner of interconnection. As shown, the controller includes a microprocessor processing chip 34, a programmable read only memory (PROM) 36, a random access memory (RAM)—input-output (I/O) device 38, all mutually interconnected. For clarity's sake, a plurality of similar chip interconnections are shown by a single line. For example, the line 40 represents two separate interconnections from pins 14 and 15 of the processor 34 to pins 22 and 23 of the PROM 36. Other multiple interconnections are shown similarly. In addition, lines interconnecting FIGS. 5 and 6 have the same alphabetic designation.

The line 42 interconnecting pins 6–13 of the processor 34 and the pins 2–7 and 40 of the RAM 38 carry addresses of information that is to be written into the RAM 38 or read therefrom over the bi-directional data line 44. For example, when the RAM 38 is in the "write" mode, it stores at addresses indicated on address line 42 the information received on data line 44. Such information may include, for example, the starting and stopping addresses of selected tape segments. Addresses of program instructions in the PROM 36 are sent thereto from the processor 34 via the line 46 and the instructions are returned to the processor 34 via line 48.

The processor 34 can, of course, select either the PROM 36 or the device 38 by the addresses it generates. Such selection is effected by the illustrated connection of NAND gates 49a, 49b, 49c. In operation, gates 49a and 49b sense the high order digits of the addresses sent from the processor 34 such that the gate 49a puts a low level signal on pin 20 of the PROM 36 for selecting the latter device. Gates 49b and 49c then signal pin 37 of the device 38 to indicate its non-selection. The converse operation selects the device 38.

To provide the customary clock pulses for the processor 34 and the RAM 38, there is provided a resistor 50 and a capacitor 52 interconnected with inverters 54 and 56 as shown. The clock pulses appear at pins 27 and 28 of the processor 34 and at pin 39 of the RAM 38.

There are several conditions when it is desirable to manually or automatically reset the processor 34 and the RAM 38 to initialize their internal logic. Such reset is effected by causing lines 58 and 60 to assume a momentary low level. Hence, a reset button 62 is included which, when depressed, causes gate 64 to drive lines 58 and 60 low. In addition, resistors 66, 68, and 70, transistor 72 and capacitor 74 in combination sense power turn-on and cause a momentary low to appear on lines 58 and 60 when the power supply reaches its design level, five volts, for example. Further, to initialize logic when a tape cassette is removed from the machine 10, a switch 76 (FIG. 6) is included to signal the opening of the cassette door via the line 78. The line 78 connects through pins 4 of a connector 55 to a pull-up resistor 80 and to the input of an inverter 82 to drive lines 58 and 60 low whenever the cassette door is opened.

Because the processor 34 must always "know" the position of a tape being replayed in order to start and stop the tape at the starting and stopping addresses of the selected tape segments, pulses are provided to the processor 34 via the line 84. Those pulses are generated as the tape is transported and are counted by the controller to determine the location of the tape. To insure that the controller can always count those pulses as they arrive, the line 84 is coupled to a non-maskable interrupt pin 4 of the processor 34. Thus, regardless of where the controller is in its program (to be described hereinafter) the fact that the processor receives the pulses at its interrupt input allows it to interrupt the execution of its program to count an incoming pulse.

The generation of the pulses is achieved by a pulse generator 86 (described in more detail below) which transmits its pulses to a driver 88 and thence to pin 1 of the connector 55. From that pin 1, the pulses are coupled via line 90 through a resistor 92 to both inputs of an AND gate 94. The gate 94 is interconnected with resistors 96, 98 and 100 and capacitor 102 to reduce the amplitude of the received pulse to about 5 volts and to shape it. The pulse output of the gate 94 is applied to a current driver comprising gates 104, 106 and 108 connected in parallel. The outputs of the latter gates are applied to an inverter 110 and thence to the processor 34 via line 84.

The pulse generator 86 may be any suitable type of generator producing pulses whose number is representative of the length of tape transported between the supply reel and the take-up reel. For example, a pulse generator of the type found in the aforementioned Panasonic machine is shown in FIG. 4. It includes a rotating shaft 112 driven from a belt 114, the latter of which is coupled to the machine's take-up reel. A disc 116 is interposed between a light source 118 and a light-sensitive receiver 120. In addition, an aperture 122 is formed in the disc 116 so that, as the latter rotates, light is intermittently passed through the aperture 122 to the receiver 120. A pulse appears on the line 124 whenever the light from the source 118 passes through the aperture 122 and strikes the receiver 120.

In the conventional video playback machine, a pulse generator similar in function to that of generator 86 is usually found. However, the conventional, unmodified machine merely detects the presence of pulses from the generator to determine whether the tape is being transported. In the embodiment described herein, the pulses from the generator 86 are counted to determine tape position.

To ensure correspondance between the position of the tape as indicated by the footage counter 20 (FIG. 1) and the position of the tape as indicated by the pulses received from pulse generator 86, the tape may be run through the machine while the pulses are counted. The number of pulses thus counted may then be divided by the amount by which the footage counter 20 advances. The result of that procedure may indicate, for example, that approximately 17.75 pulses were received from the generator 86 for each increment of the footage counter 20. The controller may then be instructed to count 35 pulses and then increment its present tape position count by two, to count 36 pulses and then increment its present tape position count by two again, and to continue to alternately count 35 and 36 pulses, incrementing its tape position count by two after each such count. Thus, fractional pulses are averaged out, but the controller can only index to either odd or even numbered tape location positions, depending on where it started counting from.

On the other hand, if the number of pulses received from the generator 86 for each increment of the footage counter 20 is an integer, no averaging of the pulse is required. The controller merely increases its present tape position count by one each time it receives that integer number of counts.

According to one aspect of the invention, the front panel "play", "rewind", and "front-forward" buttons are automatically actuated by the controller by three motor/cam activators (described hereinafter). Suffice it to say at this juncture that each motor drives a cam for pulling down one of the aforesaid front panel switches when one of the motors is activated.

Figure 6:
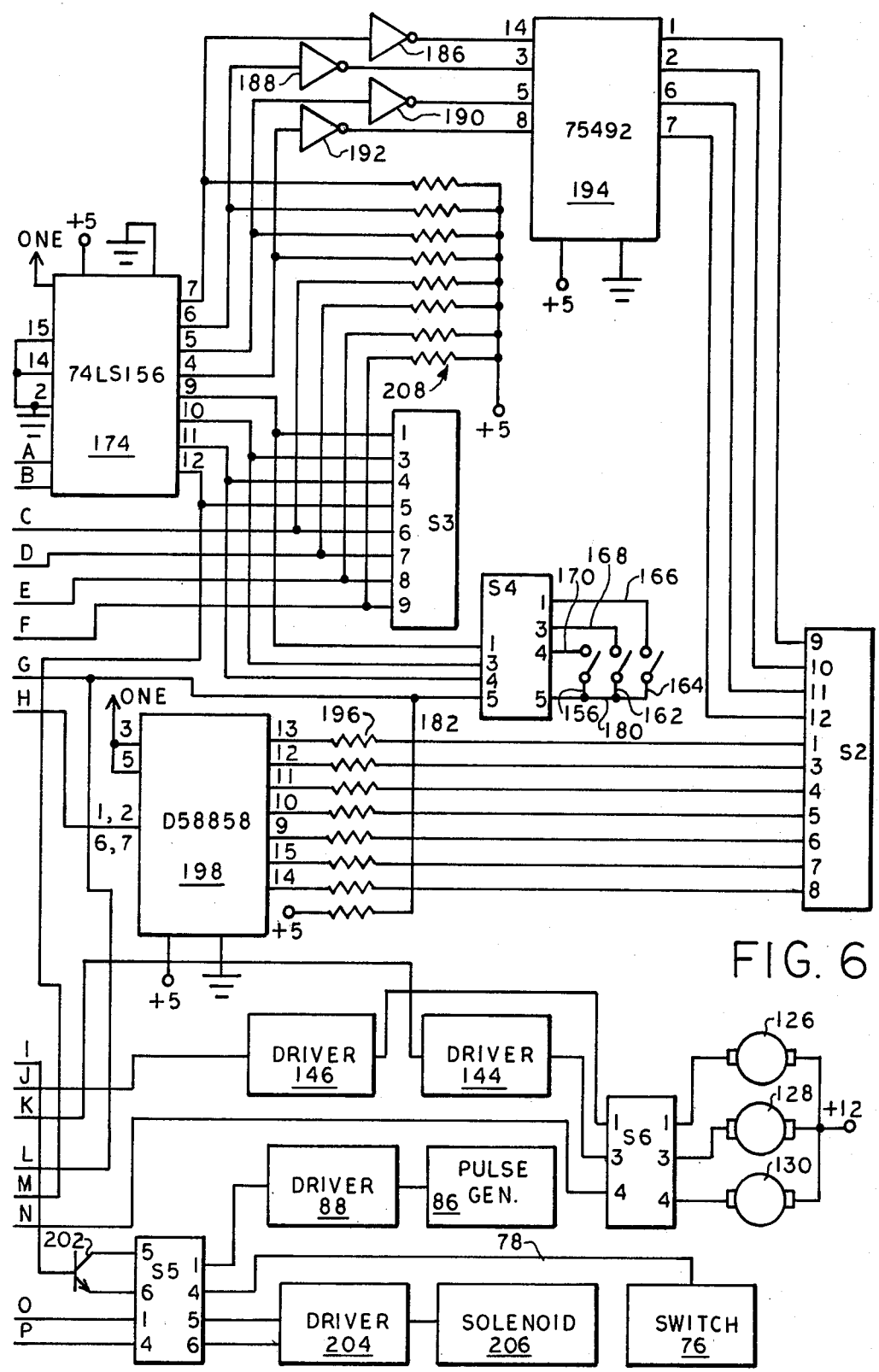

As shown in FIG. 6, motors 126, 128, and 130 are provided for activating the "play", "rewind" and "fast-forward" buttons, respectively. To actuate the motor 130, for example, the device 38 provides a signal at its pin 21 which is passed through a buffer 132 and thence to a driver comprising transistors 134, 136, and 138 and their associated resistors and diodes. The output of this driver is coupled through pin 4 of connector S6 to the motor 130.

Pins 22 and 23 of the device 38 are similarly coupled through buffers 140 and 142 to drivers 144 and 146. The latter drivers are coupled via pins 3 and 1 of connector S6 to motors 128 and 126, respectively. Although only shown schematically, drivers 144 and 146 may be identical to the driver comprising transistors 134, 136, and 138.

Referring now to FIGS. 3a and 3b, there is shown an illustrative embodiment of a motor/cam arrangement for actuating one of the front panel switches as described above. As shown, the motor 126 rotates a cam 148 which carries a roller 150. The roller 150 rides on a ledge 152 of a finger 154, the latter of which is coupled to the rewind push-button 16. In operation, energization of the motor 126 causes the cam 148 to rotate for bringing its roller 150 atop and in engagement with the ledge 152. As the cam rotates further, the cam 148 urges the roller 150 downwardly, thereby urging the finger 154 downwardly and depressing the button 16. Thus, one revolution of the motor 120 fully depresses the button 16 as effectively as if the latter were manually depressed.

As shown, a switch 156 is located beneath the cam 148. The switch includes a spring arm 158 which, when depressed, closes the switch and, when permitted to rise, opens the switch. The switch 156 is actuated by the edge of the cam 148 upon which the spring arm 158 bears. When the cam 148 rotates, it urges the spring arm 158 downwardly to close the switch 156 and when the cam 148 has completed one revolution, a recess 160 in the cam allows the arm 158 to rise, thereby opening the switch 156. Hence, the switch 156 indicates either that the motor 126 is in its inactive or rest position wherein the recess 160 receives the arm 158, or that the motor 126 has rotated to another position. The "play" button 14 and the "fast-forward" button 18 are coupled to similar motor/cam and switch arrangements.

Although not shown in FIG. 3, there is preferably included a hold-down latch for holding down each push-button switch that has been depressed. In addition, a solenoid is preferably included for release of the latch and the front panel push buttons by the controller.

Referring again to FIGS. 5 and 6, the switch 156 (FIG. 6) is shown along with similar switches 162 and 164, the switches 162 and 164 being associated with the "play" and "fast-forward" front panel push-buttons. To sense the status of the switches 156, 162 and 164 and the status of the motors 126, 128, and 130, strobe lines 166, 168 and 170 are coupled via pins 1, 3 and 4 of connector S4 to pins 9, 10, and 11 of a dual two-line to four-line decoder 174. In response to binary signals received on lines 176 and 178 from the RAM 38, the decoder 174 drives one of its output pins 9-12 low, depending on which of four possible states is reflected by the signal on lines 176 and 178.

When the decoder 174 strobes lines 166, 168 and 170, a low appears on a return line 180 whenever one of the switches 156, 162, 164 is closed, thus providing a motor status signal to the device 38 via a switch return line 182 and a buffer 184.

Because of its dual nature, the decoder 174 duplicates at pins 4-7 the same signals appearing at its pins 9-12. The former pins are coupled through buffers 186-192 to a buffer and digit driver 194, the latter of which strobes the display 24 (FIG. 2) in a conventional manner via pins 1, 2, 6, and 7 connected to the display via pins 9-12 of connector S2.

The construction of the display 24 is not shown because it may be a conventional 7-segment LED (light emissive diode) display strobed in a manner well known in the art.

The display 24 is also coupled via pins 1-8 of connector S2 through current limiting resistors 196 to pins 9-15 of a binary-to-7 segment decoder 198. It will be appreciated by those skilled in the art that the conventional display 24 may be actuated by causing a high voltage level to appear on selected pins 1-8 of connector S2 to create a specific digit and by placing a low on one of the pins 9-12 of connector S2 to select which LED is illuminated with that digit.

As indicated above, it is preferred to include a hold-down latch for holding down the depressed front panel push-buttons and a solenoid for releasing the latch. To activate that solenoid, the device 38 develops a signal at its pin 24 and passes that signal through a buffer 200 and thence to a transistor 202. The transistor 202 is coupled via pins 5 and 6 of connector S5 to a driver 204 and thence to the above-mentioned solenoid 206. Preferably, the device 38 actuates the solenoid 206 to release each depressed front panel push-button at the beginning of the controller's program.

The last connections of FIGS. 5 and 6 requiring comment are those of the pressure-sensitive numbered switches 26 and control switches 28 of the display/select panel 22 (FIG. 2). The switches 26 and 28 comprise 16 individual two-position switches which are disposed in a conventional 4 by 4 array, that is, four switches in each of four columns. One side of each switch in a column is coupled to pin 1 of connector S3 (FIG. 6). The other three columns of switches are similarly connected to pins 3-5 of the same connector.

The other side of each switch is coupled to a row connector, one switch of each column being coupled to the same row connector. Thus four row connectors are provided, each of which is connected to one of the pins 6-9 of the connector S3.

In response to the binary signals received from pins 8 and 9 of the device 38, the decoder 174 puts a low signal on its pins 9–12 for successively strobing the switches 26 and 28 via connector S3. Because the switches 26 and 28 are normally open, the pins 6–9 of connector S3 carry a high voltage level by virtue of their connection to pull-up resistors 208.

If a switch is closed, a low appears on one of the pins 6–9 of connector S3 and is applied through buffers 210–216 for input to the device 38. Because of the simultaneous strobing of pins 1–5 of connector S3 and sensing the status of pins 6–9 of that connector, the controller senses which of the switches 26, 28 are closed.

Having described the "hardware" aspects of the controller, the "software" by which the control is programmed will now be described by reference to a flow chart of the program.

Figure 7:
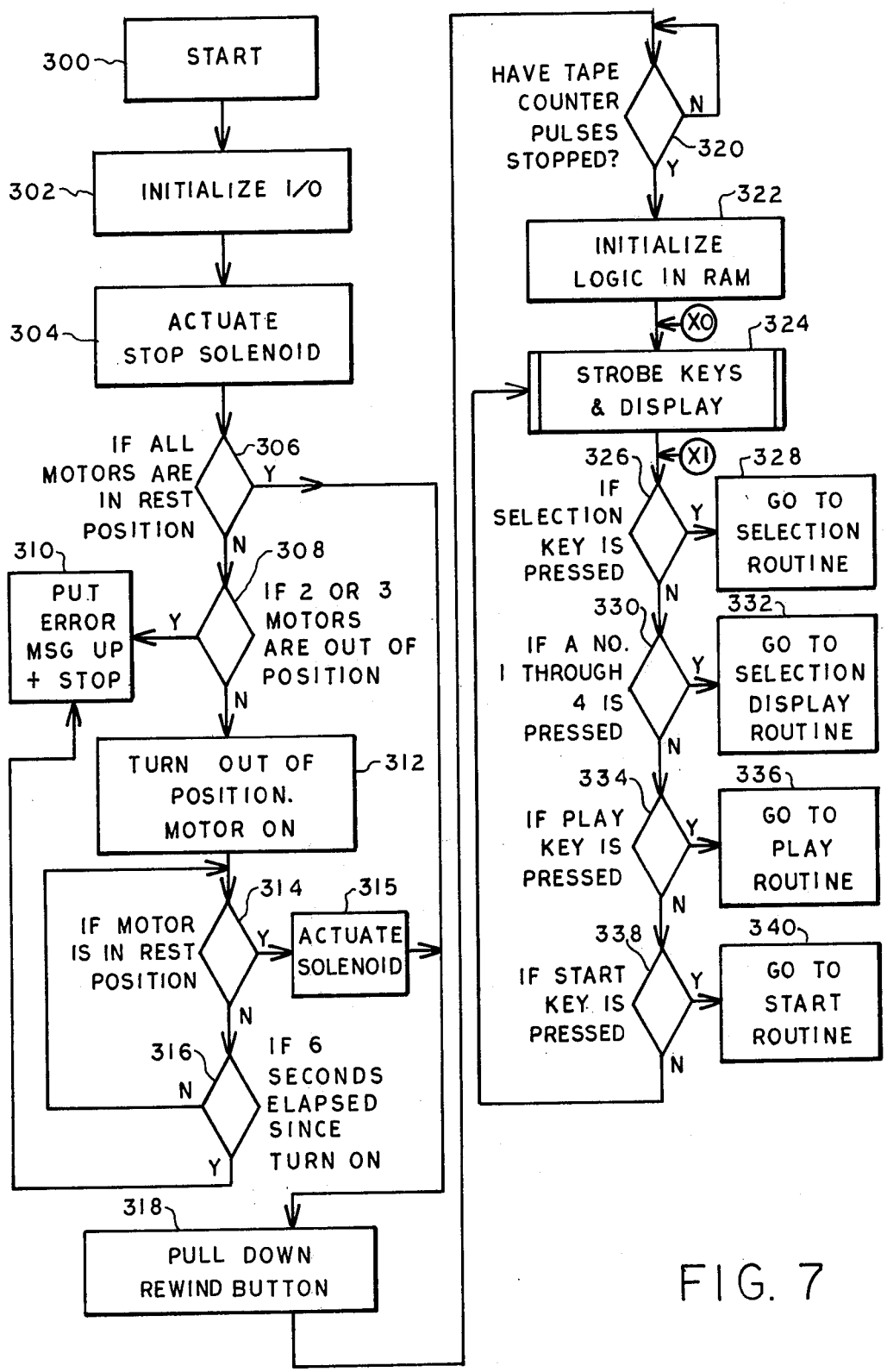
FIG. 7 depicts a generalized flow chart by which the microprocessor is programmed.

Referring now to FIG. 7, there is shown an overall flow chart by which the controller of FIGS. 5 and 6 is programmed. As shown, the program begins with the customary start instruction 300 which is entered when the controller is reset, i.e., when lines 58 and 60 of FIG. 5 are driven low. Next, instruction 302 causes the logic internal to the I/O portion of the device 38 to be initialized. Instruction 304 causes the solenoid 206 (FIG. 6) to be actuated to release all the front panel push-button keys.

When instruction 306 is executed, the status of the switches 156, 162, and 164 is sensed in order to determine if the motors 126, 128 and 130 are in their rest positions. If the controller senses that two or three of the motors are not in their rest positions, instruction 308 causes the controller to proceed to instruction 310 for actuating the front panel display 24 for displaying an error message and for stopping the machine. In normal operation, only one of the motors 126, 128 and 130 will be out of its rest position at any one time. Thus, if more than one motor is not in its rest position, this indicates a malfunction and the machine is stopped to prevent possible damage to the machine.

If after executing instruction 308 it is determined that only one motor is out of its rest position, the controller executes instruction 312 for turning on that motor and rotating it to its rest position. By instruction 314, the controller determines if the motor which has just been actuated has reached its rest position. If it has, instruction 315 is executed for actuating the solenoid 206 (FIG. 6) for releasing all front panel push-buttons. The program then advances to instruction 318 for rewinding the tape.

If the motor which was energized at instruction 312 has not yet reached its rest position, the program advances from instruction 314 to instruction 316 to determine whether six seconds have elapsed since that motor has been activated. If six seconds have not yet elapsed, the program loops between instructions 314 and 316 until either the motor reaches its rest position or six seconds have elapsed since that motor has been actuated. If the motor does not reach its rest position within six seconds, the assumption is made that the motor is stuck in an out-of-rest position and the program returns to instruction 310 for putting an error message up and stopping the machine.

Referring again to instruction 306, if as a result of executing that instruction it is determined that all motors are in their rest positions, the program advances to instruction 318 for actuating the motor associated with the front panel rewind button and for pulling that button down. Following instruction 318 there may be included further instructions such as instructions 314 and 316 to determine whether the motor associated with the front panel rewind button has rotated properly to its rest position.

As the tape is being rewound, the controller is, of course, monitoring the pulses which are then being generated by the pulse generator 86. Instruction 320 causes the controller to determine whether the tape counter pulses have stopped. If they have not stopped, the program loops at instruction 320 until those pulses have stopped, indicating that the tape has been completely rewound. When the controller has determined that the tape has been rewound, it proceeds to instruction 322 for initializing the logic internal to the RAM portion of the device 38.

Immediately below the instruction 322 is an entry point to the program designated as XO. Other program entry points are similarly designated. When the I/O logic has been initialized, the program continues to instruction 324 which causes the controller to strobe switches 26 and 28 to determine that switch, if any, is pressed, and also to strobe the LED display coupled to the connector S3 to put zeros in that display.

Following instruction 324, the program continues to instruction 326 by which the controller determines whether the selection key 28A on the panel 22 has been pressed. If that key or switch has been pressed, this indicates, of course, that the operator desires to select a starting address for a tape segment desired for replay, in which event the program advances to instruction 328 for executing a selection routine. The selection routine is described in more detail hereinafter.

If the execution of instruction 326 indicates that the selection key was not pressed, the program continues to instruction 330 to determine whether one of the switches 26 numbered 1 through 4 has been pressed. (This assumes that the controller is capable only of accepting four different selections of tape segments for replay). If the controller is capable of accepting, for example, seven different tape selections, instruction 330 would look for the depression of one of the keys 26 numbered 1 through 7. At this point in the program, the depression of one of the keys 26 indicates to the controller that the operator is designating his first tape selection if he depresses the switch 26 numbered "1". Assuming that one of the numbers 1 through 4 has been depressed, the program advances to instruction 332 for executing a selection display routine. This latter routine is described in more detail hereinafter.

If the execution of instruction 330 indicates that none of the switches 26 numbered 1 through 4 were pressed, the program continues to instruction 334 to determine if the play switch or key 28B has been pressed. If it has been pressed, the program continues to instruction 336 for executing a play routine which is described hereinafter. If the key play was not pressed, instruction 338 is executed to determine whether the start key 28C has been pressed. If the answer to that is "yes", instruction 340 is executed for proceeding to a start routine described hereinafter. If the start key was not pressed, the program returns to instruction 324 for continually strobing the front panel keys or switches and the display and continuously ascertaining which of the front panel switches have been depressed, if any.

The selection routine which is executed when instruction 326 detects the depression of the selection key 28A is shown in FIG. 8. Upon entering this routine, the first executed instruction is instruction 342 which causes the controller to blank the display 24 and to scan the front panel keyboard to thereby determine whether any switches or keys on the front panel have been pressed. Instruction 344 determines whether the last key pressed was one of the numbered keys 26. If it was, the program continues to instruction 346 to put that number in a selection number buffer and to display that same number on the display 24. If the last key pressed was not a numbered key, the program leaves instruction 344 and advances to instruction 348 to determine whether any key was pressed. If not, the program returns to instruction 342 and continuously loops through instruction 342, 344 and 348 until a key has been pressed.

If a key had been pressed but it was not one of the numbered keys 26, the program exits instruction 348 to the program entry point X1 (FIG. 7) for executing instruction 326 and the successive instructions.

Assuming that a numbered selection key 26 had been pressed, the program continues from instruction 346 to instruction 350 for again scanning the display and the keyboard, that is, switches 26 and 28, to look for the entry of starting and stopping addresses of the selected tape segments. By instruction 352, a determination is made as to whether the last key pressed, if any, is one of the numbered keys 26. If the answer to that inquiry is no, the program proceeds to instruction 354 to determine if any key had been pressed. If none has yet been pressed, instruction 350 is executed again and the program loops through instructions 350, 352, and 354 until one of the numbered keys (switches) 26 are pressed. Alternately, if the execution of instruction 354 indicates that some key, but not a numbered key, was pressed, the program returns to entry point X1 for execution of instruction 326 (FIG. 7).

Assuming that the execution of instruction 352 resulted in the determination that a key had been pressed and that that key was a numbered key, the program continues to instruction 356 to determine whether six of the numbered keys 26 have been pressed, those six numbers corresponding to three digits of the starting address and three digits of the stopping address. If the starting addresses and the stopping addresses have been completely entered, the program advances to instruction 358 for storing the start and stop addresses in a register. When those addresses have been stored, the program continues to entry point X0 for execution of instruction 324 and the continued sampling of the keys.

If six address numbers have not yet been entered, the program continues to instruction 360 to determine whether a fourth number has been entered. If it has been entered, this signifies that the starting address has been completely entered and the last entered number is the first digit of the stopping address, whereupon the program continues to instruction 362 for blanking the display 24. If the fourth number has not yet been entered, the program continues to instruction 364 for displaying the last received number. Thereupon, the program returns to instruction 350 and the subsequent instructions for continuously strobing the keyboard to ascertain and store the starting and stopping addresses. When those addresses have been completely entered and stored, the program will exit at instruction 358 and return to entry point X0.

Should the operator wish to enter the starting and stopping addresses of a second tape segment, he merely presses the selection key 28a again, presses the switch 26 numbered "2", and then enters the starting and stopping addresses of the second tape segment. Further tape segment entries are entered in the same manner.

Assuming now that all starting and stopping addresses of all desired tape segments have been entered, and if instruction 330 detects that a selection number has been pressed, the program advances to the selection display routine shown in FIG. 9 to display the starting and stopping address of the tape segment number called for. The routine starts with instruction 366 whereby the starting address of the selection number entered by the operator is read from the register where it was stored. Next, instruction 368 causes the starting address to be displayed by the display 24 and the selection number entered by the operator put into a buffer. For example, if the operator pressed selection number "2" for reading back from the display 24 the starting address of selection number 2, the number 2 is placed in the buffer.

According to instruction 370, the keyboard and display are scanned again to look for further selection numbers entered by the operator. If another selection number is detected, instruction 372 determines whether the last detected selection number is the same as the number previously put into the buffer upon execution of instruction 368. If it is the same number, the program proceeds to instruction 374 for reading the stop address of that same entered selection number and, according to instruction 376, displaying that stop address on the display 24. Thus, if the operator presses selection number "2" twice, the first depression thereof will cause the starting address of that segment to be displayed and then the stopping address of that selection number. However, if something other than the same selection number is twice depressed, the program proceeds from instruction 372 to instruction 378 to determine if any other key has been depressed; if not, the program returns to instruction 368 and loops through this part of the program until another key is depressed. If instruction 378 determines that something other than the same numbered key is pressed, the program advances to entry point X1 for execution of instruction 326 and the subsequent instructions.

Assuming that the operator has at this point entered all the starting and stopping addresses of his selected tape segments and had those addresses read back on the display 24 according to the selection display routine, the operator now designates which sequence he wishes the various tape segments to be replayed in. The play routine illustrated in FIG. 10 allows the operator to make this sequential selection.

The play routine begins with instruction 380 for blanking the display 24. Then the keyboard and the display are strobed according to instruction 382. If the controller determines that one of the numbers entered is 1 through 4 (assuming that the machine is capable of handling 4 tape segments), instruction 384 advances the program to instruction 386 by which the controller determines if start and stop locations for the number just entered by the operator have been previously entered. If they have not, the program returns to instruction 382 to continue looking for a proper selection number. Instruction 388 merely returns the program to entry point X1 if something other than number 1 through 4 was entered by the operator. If no entry was detected by the controller, instruction 388 returns the program to instruction 382 to continue searching for an entered selection number.

According to instruction 390, the controller stores the entered selection number or numbers in a play order buffer, after which instruction 392 determines whether four selection numbers have been entered by the operator. If four selection numbers have not yet been entered, the program returns to instruction 382 to continue searching for the remaining selection numbers. In the event that four selection numbers have been entered by the operator, instruction 392 advances the program to entry point X0 for execution of instruction 324 (FIG. 7) and the subsequent instructions again. Thus, the play routine instructs the controller as to which sequence the operator desires the selected tape segments to be played in. Clearly, any sequence is permissible.

Figures 10, 11:
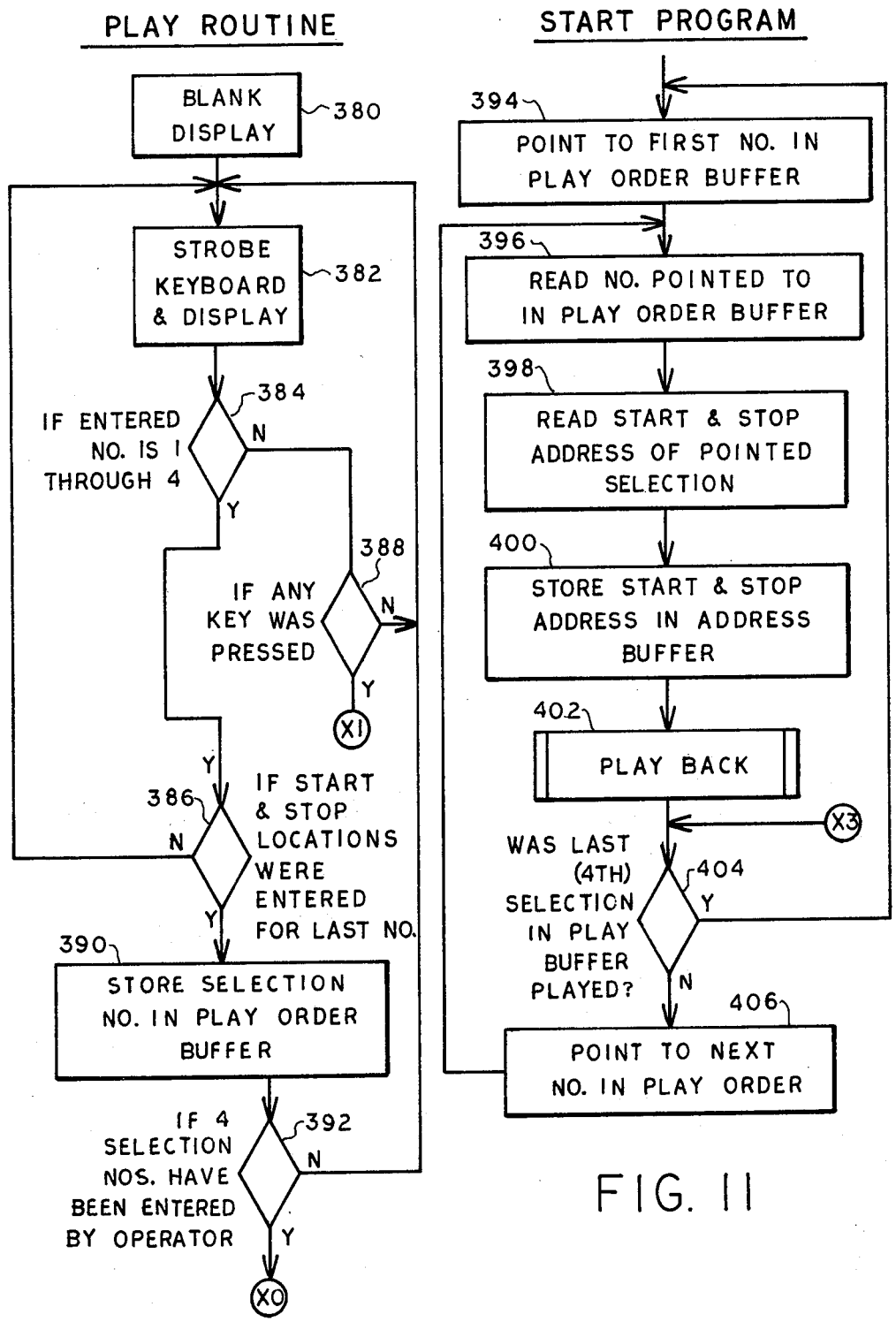
FIG. 10 is a flow chart of a play routine shown generally in FIG. 7.
FIG. 11 is a flow chart of a start routine shown generally in FIG. 7.

After the operator has instructed the controller as to which sequence he desires the tape sequence to be replayed in, the operator presses the start button 28C which causes the program to execute the start routine shown in FIG. 11. In this routine, instruction 394 is executed first for pointing to the first number in the play order buffer. It will be recalled that the selection numbers, i.e., 1 through 4, were stored in the play order buffer in the sequence in which they were to be replayed. Assuming that the operator instructed the machine to play sequences 3, 4, 1, and 2, in that order, the first pass through instruction 394 would cause the pointer to point to the number 3 in the play order buffer.

Next, the controller is instructed to read the number pointed to in the play order buffer (instruction 396) and then, by instruction 398, to read the starting and stopping addresses of the tape selection number pointed to.

Next, instruction 400 causes the controller to store the start and stop addresses just read into an address buffer. Instruction 402, actually a routine in itself, then causes the first tape segment in the sequence to be played back. The routine 402 is described in more detail hereinafter.

After the first tape segment in the indicated sequence has been played back, instruction 404 causes the controller to inquire whether the last (4th) selection in the playback buffer has been played. If it has not, the program continues to instruction 406 to point to the next number in the play order buffer. Thereupon the program returns to instruction 396 to read the next number in the play order buffer. The program then continues through the remaining instructions in the start program and loops therethrough four times (assuming four tape segments have been selected) until each tape section has been played back in the sequence desired.

Figure 12:
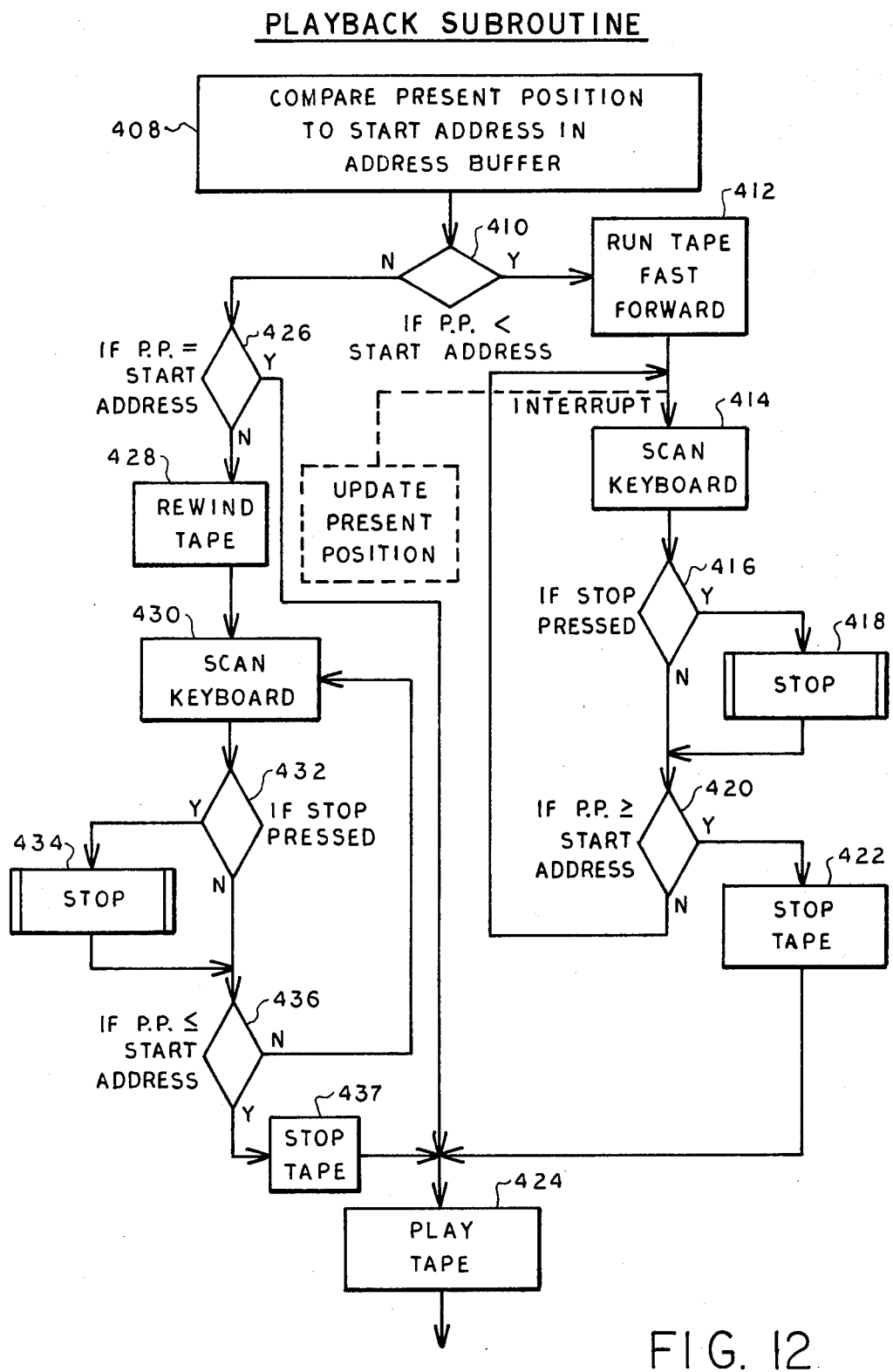
FIGS. 12 and 13 depict a flow chart of a playback sub-routine shown generally in FIG. 11.

Playback routine 402 of FIG. 11 is shown in more detail in FIG. 12 to which reference is now made. This routine starts with instruction 408 by which the controller compares the present position of the tape to the starting address in the address buffer. This starting address, on the first pass through this routine, corresponds to the starting address of the first tape segment to be played back.

It will be recalled that the controller initially caused the tape to be rewound and that the processing chip 34 continuously monitors the position of the tape by counting the pulses generated by the pulse generator. Hence, just subsequent to the rewind of the tape, the controller "knows" where the tape is and any subsequent movement of the tape in a forward direction will be monitored by the controller so that it knows at all times how much tape has been transported.

According to instruction 410 the present position (P.P.) of the tape, as determined by the counting of the pulses from the pulse generator, is compared to the start address of the first tape segment to be replayed. If the present position of the tape is less than that starting address, the program advances to instruction 412 for causing the tape to be transported in the fast forward mode. As the tape is being transported, the switches on the keyboard are constantly monitored to determine whether the operator has pressed the stop button (instructions 414 and 416). If he has, the program executes instruction 418 to stop the machine. This instruction 418 is actually a small sub-routine which is described more completely hereinafter. Assuming that stop command has been removed, or if the stop button had never been pressed, the program continues with instruction 420 to determine whether the present position of the tape is equal to or greater than the starting address of the first tape segment. If the answer to that inquiry is no, the program continues looping until that condition is satisfied, whereupon the program executes instruction 422 for stopping the tape. Thereupon the controller causes that tape segment to be replayed according to instruction 424.

Returning again to instruction 410, the situation will arise where the present position of the tape is not less than the starting address of the tape segment to be replayed, in which event the program will advance to instruction 426 to determine if the present position of the tape is equal to the starting address. If it is, the program advances immediately to instruction 424 for playing the tape. If it is not, instruction 428 is executed for rewinding the tape, and the switches on the keyboard are continuously scanned according to instruction 430. Once again, the status of the stop button is sensed to determine whether the operator has pressed it (instruction 432). If that button is depressed, the program advances to instruction 434 for stopping the machine. If the stop button is not pressed while the keyboard is being scanned during the rewinding of the tape, the program executes instruction 436 to determine if the present position of the tape is yet less than or equal to the start address of the next tape segment. If that condition is not met, the program continues looping through instructions 430, 432 and 436 until the present position of the tape is equal to or less than the starting address of the next tape segment, whereupon instruction 437 is executed for stopping the tape and instruction 424 is executed for playing the tape.

It will be noted that between instructions 412 and 414 an "update present position" instruction 438 is included in dashed lines. This is the instruction which causes the controller to count each pulse generated by the pulse generator as it is received by the processor chip 34 for updating the controller's information concerning the position of the tape. This instruction is shown in dashed lines to indicate that it is executed not at any specific point in the program but rather, it is executed whenever a pulse is received by the controller 34. This is possible because pulses from the pulse generator are fed through the interrupt line 84 of the processor 34 so that that counting function is effected whenever a pulse is received, irrespective of where the controller is in the program.

Figure 13:
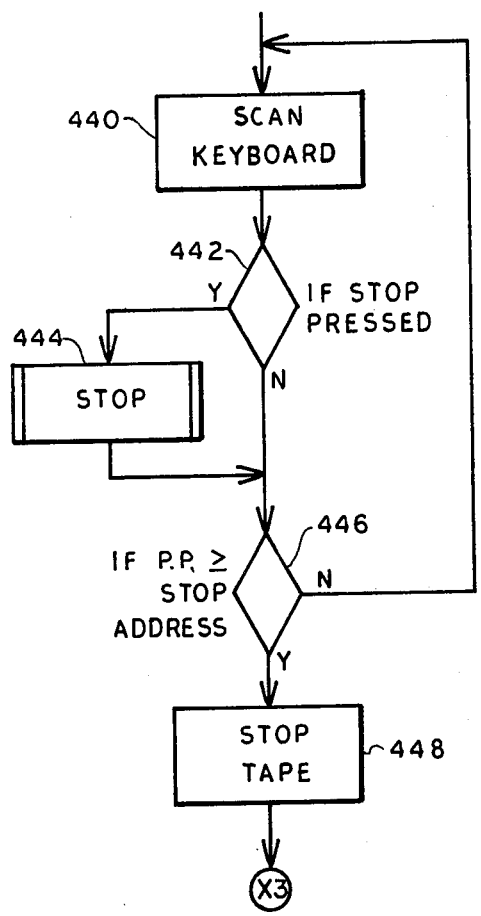

After execution of instruction 424, the program advances to instruction 440 (FIG. 13). According to this instruction and instructions 442 and 444, the controller continues to scan the keyboard looking for the depression of the stop button. If it does not receive it, it continues to instruction 446 to determine whether the present position of the tape which is being played is equal to or greater than its stopping address. If that condition has not yet been met, the program continues looping through instructions 440 through 446 until that particular tape segment has completed playing, whereupon the program executes instruction 448 for stopping the tape. Thereupon, the program advances to entry point X3 for execution of instruction 404 (FIG. 11). Accordingly, the controller will once again determine whether each designated tape selection has been played, and if it has not, will continue looking through the start program of FIG. 11 until the replay of each selected tape segment has been completed.

As is apparent, it is important that the controller "know" which portion of the tape is passing by the play head at any given time. Only by knowing the position of the tape can the controller determine when to start and stop tape replay and when to stop rewind of the tape. For example, if the controller's tape position count indicates that the tape is at position 200 when the tape is actually at position 199, and if the controller attempts to stop rewind when its count indicates tape position zero, it will continue trying to rewind after the tape has actually reached its zero position. To avoid that possibility, it is preferable that when the controller causes the tape to be transported to a position less than 10, the controller rewind the tape until pulses from the pulse generator 86 stop (indicating full rewind of the tape). When that occurs, the controller sets its present tape position count to zero.

Another possible error can occur when the controller is comparing present tape location to start and stop addresses. For example, if a start address is 198 (decimal) and the controller's count of present tape position is $\phi 99$ (decimal), the controller compares the low bytes (98 and 99). After that comparison, it compares the high bytes (1 and $\phi$). Based on that comparison it "knows" the difference between present tape position and the start address. However, if the controller receives an additional pulse from the pulse generator 86 after having compared the low bytes and before having compared the high bytes, the tape position count may increase to 100. If that occurs, the controller will complete the byte comparisons as though it were comparing 198 to 199 instead of comparing 198 to 100. To avoid that error, it is preferable to save the low byte (99) of the present tape position count and see if it has changed after comparing the high bytes. If it has changed, the controller is instructed to consider that previous comparison as invalid and to make a new comparison using the latest tape position bytes.

Figure 14:
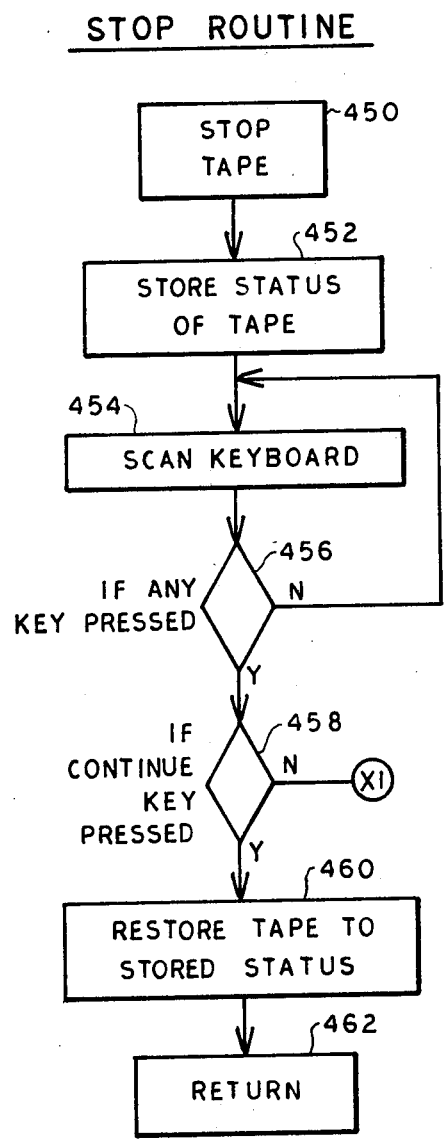
FIG. 14 is a flow chart of a stop routine shown generally in FIGS. 12 and 13.

Referring now to the stop routine shown in more detail in FIG. 14, that routine begins with a "stop tape" instruction 450 followed by instruction 452 which directs the controller to store the status of the tape. The next instruction 454 causes the controller to again scan the keyboard looking for depressed keys. According to instruction 456, if any key is pressed, the program continues to instruction 458. If not, it continuously loops through instructions 454 and 456 looking for a pressed key.

According to instruction 458, the controller determines whether the continue key 28F is depressed. If it is not, the program advances to entry point X1 for continuing the program since it is evident that the depression of another key indicates that the operator wishes to discontinue the stop function but does not wish to resume the program at the point where it entered this stop routine. However, if the continue key is pressed, the program advances to instruction 460 by which the machine restores the tape to its former status. That is, the machine is put back into the fast forward, play or rewind mode. Thereafter, instruction 462 is executed for returning the program to control of the routine from which the stop routine was entered.

As is evident from the description above, the system disclosed herein provides maximum flexibility for reformatting any video tape or, for that matter, any tape for replay of selected tape segments in any sequence. The starting and stopping positions of each film segment are entirely under the control of the operator so that different tape segments may actually include the same material. In addition, the system described herein is well adapted for use as an "add on" to existing conventional playback machines.

Although the invention has been described in terms of a specific embodiment, it will be obvious to those skilled in the art in light of this disclosure that many alterations and variations therein may be made without departing from the spirit and scope of the invention. Accordingly, it is intended that all such modifications and alterations be included within the scope of the invention as defined by the appended claims.

What is claimed is:

1. For use with a tape playback machine, a system for selecting and replaying desired tape segments in any predetermined sequence, comprising:
   means for manually entering a plurality of tape addresses corresponding to starting addresses of segments of the tape selected for play back and for entering tape addresses corresponding to stopping addresses of the selected segments of tape;
   means for manually selecting any sequence in which the tape segments are to be played back; and
   a controller for storing said tape addresses and for causing the playback machine to replay each selected tape segment from its starting address to its stopping address in the sequence selected,
   whereby multiple segments of a tape may be selected for replay, each such segment beginning and stopping at any selected location on the tape, and all such segments are replayed in a selected sequence.

2. A system as set forth in claim 1 wherein said playback machine includes control switches which are adapted to be actuated by an operator for operation of the machine in a manual mode, and wherein said system includes control switch actuators responsive to said controller for operating the machine in an automatic mode.

3. A system as set forth in claim 2 wherein said control switch actuators are movable by said controller to an operative position for actuating said control switches and to a rest position, and wherein said controller is adapted to sense the positions of said control switch actuators for inhibiting automatic operation of the playback machine when more than one of said control switch actuators is in its operative position.

4. For use with a tape playback machine, a system for selecting and replaying desired tape segments in any predetermined sequence, comprising:
   means for generating human-readable, continuously updated, tape position indicia corresponding to the position of the tape in the playback machine, said indicia constituting the address of the tape segment being played back;
   means for manually entering a plurality of tape addresses corresponding to starting addresses of segments of the tape selected for playback and for manually entering tape addresses corresponding to stopping addresses of said selected segments of tape, said starting and stopping addresses corresponding to said tape position indicia;

means for selecting any sequence in which the selected tape segments are to be played back; and an electronic controller for storing said starting and stopping addresses, for causing the playback machine to transport the tape to the starting address of the tape segment selected for first playback, for actuating the playback machine to play back the tape segment selected for first playback, for stopping said playback when the tape has arrived at its stop address, and for actuating the playback machine to transport the tape to the starting addresses of second and successive tape segments in the sequence selected so as to play back said tape segments between their starting and stopping addresses, whereby an operator may ascertain the contents of the tape as it is initially played back and select various segments thereof for further play back by noting and entering the starting and stopping addresses thereof as indicated by the tape position indica, and may further select any sequence in which the selected tape segments are to be played back, thus causing the playback machine to replay the selected tape segments in any selected sequence.

5. A system as set forth in claim 4 wherein said means for manually entering and storing tape addresses includes a plurality of numbered switches adapted to be actuated by an operator to enter the starting and stopping address of selected tape segments.

6. A system as set forth in claim 4 wherein said means for generating tape position indicia includes a tape footage counter.

7. A system as set forth in claim 4 wherein said controller includes means for sensing the location of the tape as it is transported in the playback machine and means for comparing the sensed location of the tape to the starting and stopping addresses of the selected tape segments.

8. A system as set forth in claim 7 including a signal generator for generating pulses representative of tape travel through the playback machine, and wherein said sensing means counts said pulses.

9. A system as set forth in claim 8 wherein said signal generator and said means for generating tape position indicia are synchronized such that a given increment in the tape position indicia at least approximately corresponds to a given number of pulses so that the controller can actuate the playback machine for advancing the tape to an entered address of a tape segment and stop that advance when a given number of pulses have been counted.

10. A system as set forth in claim 7 wherein said playback machine is adapted to operate in a manual mode by operator manipulation of control switches and is adapted to operate in an automatic mode under control of said controller, and including means responsive to said controller for actuating said switches in the automatic mode so as to duplicate operator manipulation.

11. A system as set forth in claim 10 wherein said means for actuating said switches includes a motor associated with each switch, a cam rotated by each of said motors, and means carried by each cam for actuating one of said switches.

12. A system as set forth in claim 11 wherein each of said switches is a depressible push-button switch, and including a roller carried by each cam for engaging and urging downwardly means depending from each of said switches.

13. A system as set forth in claim 11 including means responsive to the rotational position of each of said cams for indicating to said controller the rotational position of each of said cams.

14. A system as set forth in claim 13 wherein said indication means includes switch means adapted to be closed when the cam rotates to a given position and adapted to open when said cam rotates off said given position.

15. A system as set forth in claim 4 including a display panel mounted on said playback machine, said panel including a human-readable display, and wherein said controller includes means for actuating said display to read out the starting and stopping addresses of selected tape segments in response to operator command.

16. For use with a video tape playback machine, a system for selecting and automatically replaying desired tape segments in any predetermined sequence, comprising:

means for generating human-readable tape position indicia corresponding to the position of the tape in the playback machine, said indicia constituting the address of that portion of the tape being played back;

a display panel mounted on the playback machine, said panel including a human-readable display, a plurality of numbered, operator actuatable selection switches, and a plurality of operator actuatable function switches;

a microprocessor-based controller operatively coupled to said display, said selection switches and said function switches, said controller being programmed to store starting and stopping addresses of selected tape segments entered by an operator by manipulation of said selection switches, programmed to actuate said display to read out to an operator the entered starting and stopping addresses of selected tape segments, and programmed to accept instructions as to the sequence in which the selected tape segments are to be replayed in response to operator manipulation of said function switches, and to actuate the playback machine to replay each selected tape segment from its starting address to its stopping address in the operator-selected sequence.

* * * * *